(12) United States Patent
Staats et al.

(10) Patent No.: US 10,889,276 B2
(45) Date of Patent: Jan. 12, 2021

(54) METHOD AND APPARATUS FOR LEARNING AND VALIDATING BRAKE DECELERATION RATES

(71) Applicant: Westinghouse Air Brake Technologies Corporation, Wilmerding, PA (US)

(72) Inventors: Andrew Ryan Staats, Cedar Rapids, IA (US); Keith Edward Smith, Cedar Rapids, IA (US); Brian James Langstraat, Cedar Rapids, IA (US); Stuart John Barr, Cedar Rapids, IA (US); James A. Oswald, Coggon, IA (US); Jeffrey D. Kernwein, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 215 days.

(21) Appl. No.: 16/146,185

(22) Filed: Sep. 28, 2018

(65) Prior Publication Data
US 2020/0070790 A1 Mar. 5, 2020

Related U.S. Application Data

(63) Continuation-in-part of application No. 16/116,115, filed on Aug. 29, 2018, now abandoned.

(51) Int. Cl.
*B60T 8/32* (2006.01)
*B60T 8/58* (2006.01)
(Continued)

(52) U.S. Cl.
CPC ............ *B60T 8/3235* (2013.01); *B60T 8/172* (2013.01); *B60T 8/1705* (2013.01); *B60T 8/58* (2013.01); *B61H 13/34* (2013.01); *H04L 67/125* (2013.01)

(58) Field of Classification Search
CPC .......... B60T 8/3235; B60T 8/58; B60T 8/172; B60T 8/1705; B60T 13/665; B60T 7/02;
(Continued)

(56) References Cited

U.S. PATENT DOCUMENTS 4,988,061 A * 1/1991 Miller ..................... B61L 23/00
246/182 R
5,072,900 A * 12/1991 Malon ................. B61L 27/0038
246/182 B
(Continued)

*Primary Examiner* — Mary Cheung
(74) *Attorney, Agent, or Firm* — Christopher R. Carroll; The Small Patent Law Group LLC

(57) ABSTRACT

In a method of train deceleration, a train computer: (a) causes brakes of the train to be set according to a target deceleration curve, profile, or braking model estimated to decelerate the train from a present speed at a present location to a target speed at a target location; (b) during deceleration of the train according to the target deceleration curve, profile, or braking model of step (a), determines an actual deceleration curve of the train; (c) in response to determining from the actual deceleration curve that the train will overshoot the target speed at the target location, determines another target deceleration curve, profile, or braking model estimated to decelerate the train to the target speed at the target location; and (d) causes the brakes of the train to be set according to the other target deceleration curve, profile or braking model of step (c).

20 Claims, 6 Drawing Sheets

(51) Int. Cl.
*H04L 29/08* (2006.01)
*B60T 8/172* (2006.01)
*B60T 8/17* (2006.01)
*B61H 13/34* (2006.01)

(58) Field of Classification Search
CPC ....... B60T 8/174; H04L 67/125; H04L 67/02; H04L 67/12; B60H 13/34; G05B 13/0265; G05D 1/021
See application file for complete search history.

(56) References Cited

U.S. PATENT DOCUMENTS

| | | | | |
|---|---|---|---|---|
| 5,487,516 | A * | 1/1996 | Murata | B61L 27/0022 246/182 C |
| 6,427,811 | B1 * | 8/2002 | Wedge | B60T 7/16 188/162 |
| 7,395,141 | B1 * | 7/2008 | Seck | B61C 17/12 246/182 R |
| 9,283,945 | B1 * | 3/2016 | Kernwein | B60T 17/228 |
| 9,714,041 | B2 | 7/2017 | Oswald | |
| 2013/0006452 | A1 * | 1/2013 | Takagi | B60L 9/00 701/20 |
| 2015/0078276 | A1 * | 3/2015 | Nagasaki | B60L 15/40 370/329 |
| 2016/0297456 | A1 * | 10/2016 | Nameki | B61L 3/004 |
| 2017/0305396 | A1 * | 10/2017 | Shiratsuchi | B61L 25/021 |
| 2019/0202484 | A1 * | 7/2019 | Yamamoto | B61L 25/021 |

* cited by examiner

METHOD AND APPARATUS FOR LEARNING AND VALIDATING BRAKE DECELERATION RATES

CROSS REFERENCE TO RELATED APPLICATION

This application is a continuation-in-part of U.S. patent application Ser. No. 16/116,115, filed Aug. 29, 2018, the contents of which are incorporated its entirety herein by reference.

BACKGROUND OF THE INVENTION

Field of the Invention

The present invention relates to braking of a train and, more particularly, to braking of the train according to a number of target deceleration curves, profiles, or braking models based on actual deceleration curves experienced by the train during braking.

Description of Related Art

A positive train control (PTC) is programed or configured to set the brakes of a train according to a target deceleration curve, profile, or braking model executed by the PTC, wherein the executed target deceleration curve, profile, or braking model is estimated to decelerate the train from a present speed at a present location to a target speed at a target location. Under some conditions, the target deceleration curve, profile, or braking model is adequate to decelerate the train to the target speed at the target location. However, sometimes setting the brakes according to the target deceleration curve, profile, or braking model will result in the train overshooting the target speed (including zero speed) at the target location. In an example, the train may overshoot a desired stop location. Herein, "train" is to be understood as including at least one locomotive and optionally at least one car. However, this is not to be construed in a limiting sense.

Heretofore, a train operator or engineer, upon realizing that the target deceleration curve, profile, or braking model could result in the train overshooting the target speed at the target location, would need to take appropriate action to avoid such overshooting. Moreover, sometimes, there is little or no advance warning to the train operator that the train would overshoot the target speed at the target location when the brakes are set according to the target deceleration curve, profile, or braking model.

SUMMARY OF THE INVENTION

Generally, provided, in one preferred and non-limiting embodiment or example, is a method of decelerating a train from a present speed at a present location to a target speed (including zero speed) at a target location.

In one preferred and non-limiting embodiment or example, the method can be executed in software by an on-board train control system that includes one or more processors and a memory.

In one preferred and non-limiting embodiment or example, upon determining that an actual deceleration curve exceeds an upper bound of a target deceleration, profile, or braking model, estimated to decelerate the train from a present speed at a present location to the target speed at the target location, whereupon, if allowed to continue, the train would overshoot the target speed at the target location, the method can determine another (second) target deceleration curve, profile, or braking model estimated to decelerate the train from its present speed at its present location to the target speed at the target location, and cause the train brakes to be set according the other (second) target deceleration curve, profile, or braking model.

In an example, the other target deceleration curve, profile, or braking model can be determined numerically or can be determined (selected) from a database that includes a plurality of different target deceleration curves, profiles, or braking models. In an example, the determination or selection of each target deceleration curve, profile, or braking model can be based on a profile of the track section between the present location and the target location. In an example, the database can include a plurality of profiles of track sections that can be traversed by the train. Each track profile can include information or data on the track section being curved, straight, level, inclining, and/or declining.

In one preferred and non-limiting embodiment or example, the process of determining that a current, actual deceleration curve exceeds an upper bound of a current target deceleration curve, profile, or braking model, and determining another target deceleration curve, profile, or braking model estimated to decelerate the train to the target speed at the target location and cause the train brakes to be set according the this latter target deceleration curve, profile, or braking model can be repeated any number of times as deemed suitable and/or desirable in an attempt to decelerate the train to the target speed at the target location.

In one preferred and non-limiting embodiment or example, each target deceleration curve, profile, or braking model can estimate the train's (or locomotive's) projected change in speed as a function of distance and/or time. In an example, upon determining that a target deceleration curve, profile, or braking model to be used, the brakes of the train (or the level of the train brakes) can be set according to the target deceleration curve, profile, or braking model. For example, if a determined target deceleration curve, profile, or braking model is estimated to decelerate the train at rate of X kilometers per hour (Km/h), the brakes of the train can be set to a level anticipated or expected to achieve this rate of train deceleration.

In one preferred and non-limiting embodiment or example, train conditions (weight, length, brake wear, etc.) and/or environmental conditions (cold, snow, ice, rain, sleet, etc.) can adversely affect the actual deceleration of the train in response to the brakes of the train being set according to a target deceleration curve, profile, or braking model, whereupon the actual deceleration curve can be less than estimated. Under this circumstance, the method can dynamically adjust (increase) the level of braking, e.g., during a continuous braking event, in an effort to have the train decelerate from its present speed at its present location to the target speed at the target location.

In one preferred and non-limiting embodiment or example, the method of adjusting (increase) the level of braking during a continuous braking event can be repeated any number of times during the continuous braking event, thereby progressively increasing and refining the braking effort applied by the train brakes as required to decelerate the train to the target speed at the target location.

In one preferred and non-limiting embodiment or example, each target deceleration curve or profile can include a selected level of service braking. In one preferred and non-limiting embodiment or example, at least one target deceleration curve, profile, or braking model can include emergency braking.

In one preferred and non-limiting embodiment or example, a target deceleration curve, profile, or braking model stored in memory can be refined/updated based on one or more historical actual deceleration curves realized in response to execution of one or more prior target deceleration curves, profiles, or braking models. This refined target deceleration curve, profile, or braking model can then be used for decelerating the train at a future time. In an example, the refined target deceleration curve, profile, or braking model can be at used at the future time, e.g., without having to use another target deceleration curve, profile, or braking model during a continuous braking event, to initiate deceleration of the train sooner, reducing the likelihood of overshooting a target speed (including zero speed) at a target location.

Further preferred and non-limiting embodiments or examples are set forth in the following numbered clauses.

Clause 1: A method of train deceleration by an on-board train computer, comprising one or more processors and a memory, programmed or configured to perform the steps of: (a) cause the brakes of the train to be set according to a target deceleration curve, profile, or braking model, stored in the memory, estimated to decelerate the train from a present speed at a present location to a target speed (including zero speed) at a target location; (b) during deceleration of the train according to the target deceleration curve, profile, or braking model of step (a), determine an actual deceleration curve of the train; (c) in response to determining that the actual deceleration curve will result in the train overshooting the target speed at the target location, determine another target deceleration curve, profile, or braking model estimated to decelerate the train to the target speed at the target location; and (d) cause the brakes of the train to be set according to the other target deceleration curve, profile, or braking model of step (c). In an example, steps, (a)-(d) can be part of a first continuous braking event.

Clause 2: The method of clause 1, wherein steps (a) and (d) can include the brakes operating in a service braking mode, wherein one or more wheels of the train rotate against a friction provided by a braking system of the train during movement of the train.

Clause 3: The method of clause 1 or 2, wherein step (d) can include the train decelerating to the target speed (including zero speed) at the target location.

Clause 4: The method of any one of clauses 1-3 can further include: (e) during deceleration of the train according to the other target deceleration curve, profile, or braking model, another actual deceleration curve of the train can be determined; (f) following step (e), in response to determining from the other actual deceleration curve that the train will overshoot the target speed at the target location, another target deceleration curve, profile, or braking model estimated to decelerate the train to the target speed at the target location can be determined; and (g) the brakes of the train can be set according to the other target deceleration curve, profile, or braking model of step (f). In an example, steps (e)-(g) can be part of the first continuous braking event.

Clause 5: The method of any one of clauses 1-4, wherein step (g) can include the train decelerating to the target speed (including zero speed) at the target location.

Clause 6: The method of any one of clauses 1-5 can further include: (h) repeating steps (e)-(g) at least once.

Clause 7: The method of any one of clauses 1-6, wherein: a first instance step (g) can include service braking; and an instance of step (g) after the first instance can include emergency braking.

Clause 8: The method of any one of clauses 1-7, wherein: emergency braking can include one or more wheels of the train prevented from rotating by a braking system of the train during movement of the train; and service braking can include one or more wheels of the train rotating against a friction provided by the braking system of the train during movement of the train.

Clause 9: The method of any one of clauses 1-8 can further include: (i) refining (or updating) the target deceleration curve, profile, or braking model stored in the memory according to a combination, e.g., average, of the target deceleration curves, profiles, or braking models determined in steps (c) and (f); and (j) causing the brakes of the train to be set according to the refined target deceleration curve, profile, or braking model. In an example, steps (i)-(j) can be part of the first continuous braking event or a second, different braking event.

Clause 10: The method of any one of clauses 1-9 can further include: (e) refining (or updating) the target deceleration curve, profile, or braking model stored in the memory according to the target deceleration curve, profile, or braking model determined in step (c); and (f) causing the brakes of the train to be set according to the refined target deceleration curve, profile, or braking model. In an example, steps (e)-(f) can be part of the first continuous braking event.

Clause 11: The method of any one of clauses 1-10, wherein the actual deceleration curve of the train can be determined according to ground based measurements and/or satellite based measurements.

Clause 12: The method of any one of clauses 1-11 can further include: (e) during deceleration of the train according to the other target deceleration curve, profile, or braking model, another actual deceleration curve of the train can be determined; and (f) following step (e), in response to determining that the other actual deceleration curve, profile, or braking model will result in the train undershooting the target speed at the target location, the brakes of the train can be set according to the target deceleration curve, profile, or braking model stored in the memory. In an example, step (e) can be part of the first continuous braking event, and step (f) can be part of a second, different continuous braking event. In an example, step (f) of this clause can occur (or execute) following correction or reversal of one or more train conditions that can increase stopping distance for a given target deceleration curve, profile, or braking model or profile (e.g., weight, train length, brake wear, etc.) and/or correction or recovery of the train from one or more environmental conditions that can increase stopping distance for a given target deceleration curve, profile, or braking model (e.g., cold, snow, ice, rain, sleet, etc.). In an example, step (f) can be performed after ice accumulation on the train brakes and/or track melts.

Clause 13: The method of any one of clauses 1-12 can further include: (e) during deceleration of the train according to the other target deceleration curve, profile, or braking model, another actual deceleration curve of the train can be determined; (f) in response to determining from the other actual deceleration curve that the train will overshoot the target speed at the target location, a human perceivable signal can be generated and/or a throttle of the train can be controlled, either alone or in combination with the brakes of the train being set according to the other target deceleration curve, profile, or braking model; and (g) following step (f), in response to movement of the train following deceleration to the target speed at the target location, causing the brakes of the train to be set according to the target deceleration curve, profile, or braking model, profile, or braking model stored in the memory. In an example, steps (e)-(f) of this clause can occur (or execute) in response to one or more train conditions that increase the stopping distance for a given target deceleration curve, profile, or braking model and/or in response to one or more environmental conditions that increase stopping distance for a given target deceleration curve, profile, or braking model. In an example, step (g) can occur (or execute) following correction or reversal of the one or more train conditions that increased the stopping distance for a given target deceleration curve, profile, or braking model or profile and/or correction or recovery of the train from the one or more environmental conditions that increased the stopping distance for a given target deceleration curve, profile, or braking model.

Clause 14: The method of any one of clauses 1-13 can further include communicating the other target deceleration curve, profile, or braking model from the train computer to a remote computing system via a first communication link between the train computer and the remote computing system.

Clause 15. The method of any one of clauses 1-14, wherein the remote computing system can communicate the other target deceleration curve, profile, or braking model received from the train computer to another train computer via a second communication link.

Clause 16: The method of any one of clauses 1-15, wherein each communication link can comprise a wired connection, a wireless connection, or a combination wired and wireless connection.

Clause 17: A method of train deceleration by an on-board train computer, comprising one or more processors and a memory, programmed or configured to perform the steps of: (a) cause the brakes of the train to be set according to a first service braking model; (b) following step (a), in response to determining that the train is not decelerating according to the first service braking model, cause the brakes of the train to be set according to a second service braking model; (c) following step (b), in response to determining that deceleration of the train according to the second service braking model is greater than a predetermined deceleration tolerance, cause the brakes of the train to be set to a penalty or emergency braking model; and (d) following step (c), in response to determining that the brakes of the train set according to a third service braking model will decelerate the train according to said third service braking model, cause the brakes of the train to be set according to said third service braking model. Steps (a)-(c) can be part of a first braking event of the train. Step (d) can be part of a second, different braking event of the train.

Clause 18: The method of clause 17 can further include, between steps (c) and (d), releasing the brakes of the train from the penalty or emergency braking model, wherein step (d) is performed in response to movement of the train after releasing the brakes of the train from the penalty or emergency braking model Clause 19: The method of any one of clauses 1-18, wherein the third service braking model can be the same as the first or second service braking model.

Clause 20: The method of any one of clauses 1-19 can further include: (e) communicate the determination in step (c) that deceleration of the train according to the second service braking model is greater than the predetermined deceleration tolerance to an on-board train computer of another train.

Clause 21: The method of any one of clauses 1-20, wherein, in response to receiving the determination communicated in step (e), the on-board train computer of the other train can cause the brakes of said other train to be set according to a fourth service braking model.

Clause 22: The method of any one of clauses 1-21, wherein the fourth service braking model can be the same as the first, second, or third service braking model.

BRIEF DESCRIPTION OF THE DRAWING(S)

These and other features of the present invention will become more apparent from the following description in which reference is made to the appended drawings wherein.

DESCRIPTION OF THE INVENTION

Figure 1:
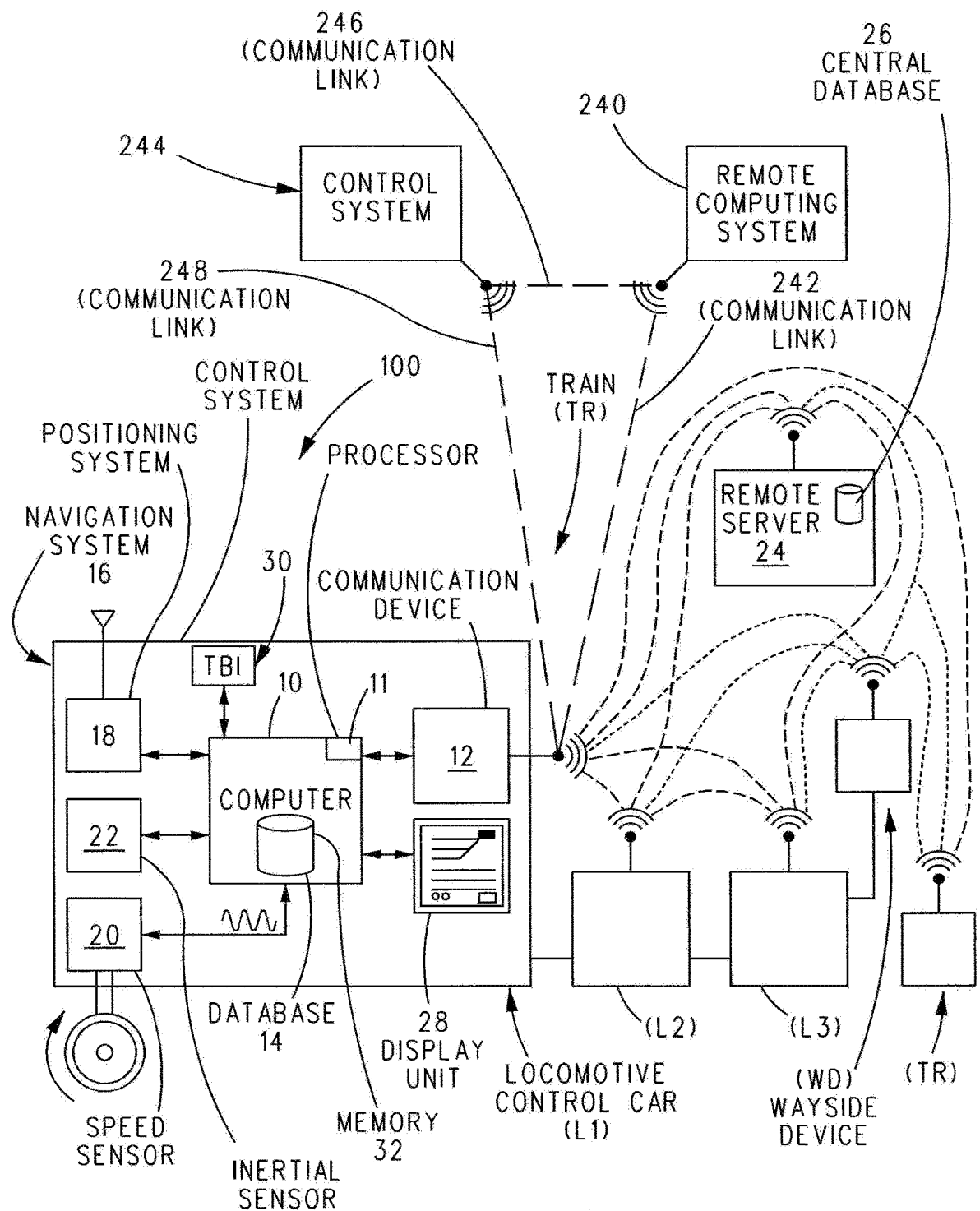
FIG. 1 is a schematic view of a train control system according the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track)) between two units, such as two locomotive units or control cars. In one preferred and non-limiting embodiment or aspect, the "communication device" is a radio transceiver programmed, configured, or adapted to wirelessly transmit and receive radio frequency signals and data over a radio signal communication path.

The present invention, including the various computer-implemented and/or computer-designed aspects and configures, may be implemented on a variety of computing devices and systems, wherein these computing devices include the appropriate processing mechanisms and computer-readable media for storing and executing computer-readable instructions, such as programming instructions, code, and the like. In addition, aspects of this invention may be implemented on existing controllers, control systems, and computers integrated or associated with, or positioned on, a locomotive or control car and/or any of the railroad cars. For example, the presently-invented system or any of its functional components can be implemented wholly or partially on a train management computer, a Positive Train Control computer, an on-board controller or computer, a railroad car computer, and the like. In addition, the presently-invented systems and methods may be implemented in a laboratory environment in one or more computers or servers. Still further, the functions and computer-implemented features of the present invention may be in the form of software, firmware, hardware, programmed control systems, microprocessors, and the like.

The control system and computer-implemented control method described and claimed herein may be implemented in a variety of systems and vehicular networks; however, the systems and methods described herein are particularly useful in connection with a railway system and network. Accordingly, the presently-invented methods and systems can be implemented in various known train control and management systems, e.g., the I-ETMS® of Wabtec Corp. The systems and methods described herein are useful in connection with and/or at least partially implemented on one or more locomotives or control cars (L) that make up a train (TR). It should be noted that multiple locomotives or control cars (L) may be included in the train (TR) to facilitate the reduction of the train (TR) to match with passenger (or some other) demand or requirement. Further, the method and systems described herein can be used in connection with commuter trains, freight trains, push-pull train configurations, and/or other train arrangements and systems. Still further, the train (TR) may be separated into different configurations (e.g., other trains (TR)) and moved in either the first direction A and/or the second direction B. Any configuration or arrangement of locomotives, control cars, and/or railroad cars may be designated as a train and/or a consist. Still further, it is to be expressly understood that the presently-invented methods and systems described herein may be implemented on and/or used in connection with an auxiliary vehicle, such as an auxiliary railroad vehicle, a maintenance vehicle or machine, a road vehicle (e.g., truck, pick-up truck, car, or other machine), a vehicle equipped to ride on the rails of the track, and/or the like.

In one preferred and non-limiting embodiment or aspect, the methods and systems described herein are used in connection with the locomotives or controls cars (L) that are positioned on each end of the train (TR), while in other preferred and non-limiting embodiments, the methods and systems described herein are used in connection with locomotives or control cars (L) that are positioned intermediately in the train (TR) (since these intermediate locomotives or control cars (L) may eventually become a controlling locomotive or control car (L) when the train (TR) is reconfigured). It is also noted that the methods and systems described herein may be used in connection with "electrical multiple unit" (EMU) or "diesel multiple unit" (DMU) configurations, where a locomotive does not technically exist, but multiple control cars would still be present. Still further, the train (TR) may include only one locomotive or control car (L) and/or some or no railroad cars. Also, as discussed above, the methods and systems described herein may be used in connection with any vehicle type operating in the railway network.

Accordingly, and in one preferred and non-limiting embodiment or aspect, and as illustrated in FIG. 1, the system architecture used to support the functionality of at least some of the methods and systems described herein includes a train management computer or on-board computer 10 (which performs calculations for or within the Positive Train Control (PTC) system, including navigation calculations), a communication device 12 or data radio (which may be used to facilitate the communications between the on-board computers 10 in one or more of the locomotives or control cars (L) of a train (TR), communications with a wayside device (WD), e.g., signals, switch monitors, and the like, and/or communications with a remote server, e.g., a back office server, a central controller, central dispatch, and the like), a track database 14 (which may include track and/or train information and data, such as information about track profile/track grade, track straightens, track curvature, track positions or locations, switch locations or information, signal information, track heading changes, e.g., curves, distance measurements, train information, e.g., the number of locomotives, the number of cars, the number of conventional passenger cars, the number of control cars, the total length of the train, the specific identification numbers of each locomotive or control car (L) where PTC equipment (e.g., an on-board computer 10) is located, and the like), and a navigation system 16 (optionally including a positioning system 18 (e.g., a Global Positioning System (GPS)), a wheel tachometer/speed sensor 20, and/or at least one inertial sensor 22 (e.g., a rotational sensor, an accelerometer, a gyroscope, and the like) that is configured to measure the rate of heading change for the locomotive or control car (L), such as a PTC-equipped locomotive or control car (L)). Further, a display unit 28 may be provided in the locomotive or control car (L) to visually display information and data to the operator, as well as display information and data input by the user.

In some embodiments, a throttle brake interface (TBI) 30 can be provided as a connection between PTC and the throttle and brakes of the train (TR) such that PTC can control the throttle and brakes. For example, the TBI 30 includes software and hardware for communicating and/or converting commands from the on-board computer 10 to the throttle and brakes of the train (TR) such that the on-board computer 10 can control the throttle and brakes. In some examples, the on-board computer 10 (or PTC) can be connected to the locomotive and/or automatic brakes via the TBI 30. The TBI can include circuitry that connects the throttle wires and braking control pipes of the train (TR) to the on-board computer. In another embodiment or aspect, the on-board computer 10 can be given direct control of the throttle and brakes of the train (TR), e.g., by modifying the on-board computer 10 to perform the software and hardware functions of the TBI or by providing a direct software and/or hardware connection from the on-board computer 10 to control the throttle and brakes of the train (TR).

Figure 2:
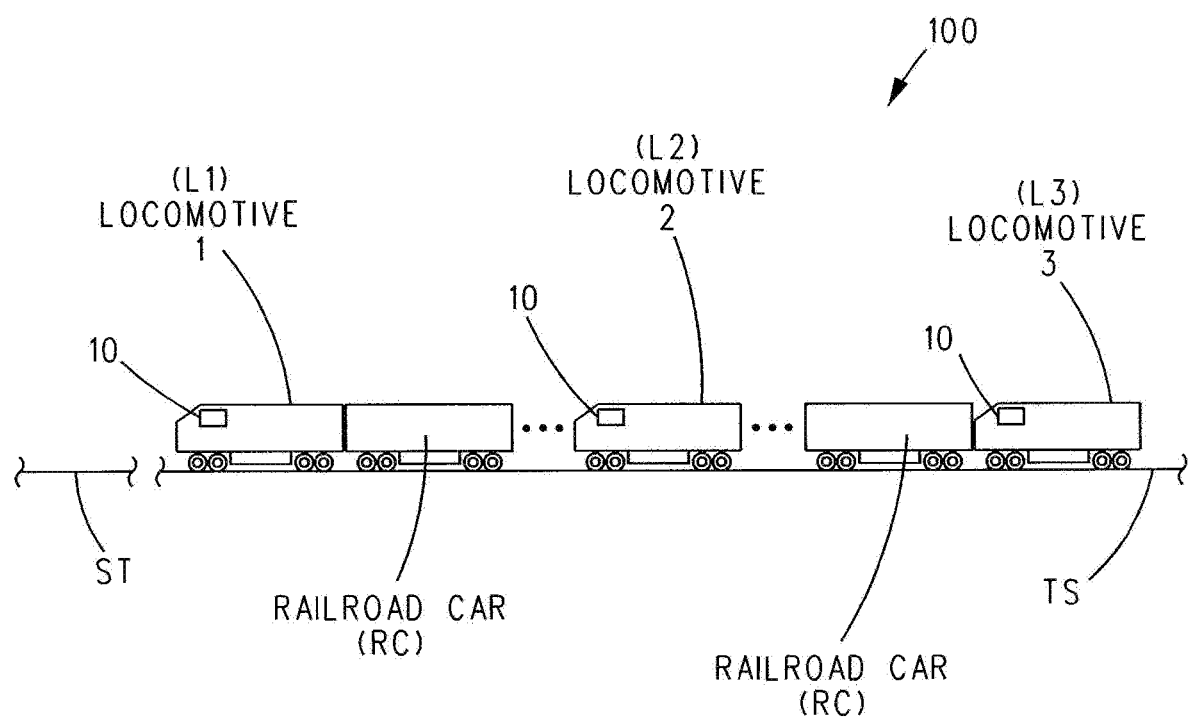
FIG. 2 is a schematic view of train that can implement the train control system of FIG. 1.

Accordingly, and in one preferred and non-limiting embodiment or aspect, provided is a control system 100 for a train (TR) having at least one locomotive (L), such as a first locomotive or control car (L1). Optionally, the train (TR) may include one or more second locomotives or control cars ((L2), (L3)) and/or one or more railroad cars (RC), as illustrated in FIG. 2. In one embodiment or aspect, the train (TR) is traversing or traveling on a track section (TS), which may include a stop target (ST), or target location. An on-board computer 10 is positioned on or integrated with one or more of the locomotives or control cars ((L1), (L2), and/or (L3)), and on-board computer 10 is programmed or configured to implement or facilitate at least one train action. Further, the one or more locomotives or control cars ((L1), (L2), and/or (L3)) are equipped with a communication device 12 that is in direct or indirect communication with the on-board computer 10 and programmed or configured to receive, transmit, and/or process data signals. At least one database 14 (e.g., a track database) is accessible by the on-board computer 10 and populated with railway data, such as train data and/or track data or information.

On-board computer 10 of the at least one locomotive can be programmed or configured to determine or receive an instruction to use train control to stop the train (TR) with respect to stop target (ST) or target location in track section (TS) of the track network.

In one preferred and non-limiting embodiment or aspect, on-board computer 10 is programed or configured to determine or receive movement data representing at least one of the following: a speed of the train (TR), an acceleration (or deceleration) of the train (TR), or the combination thereof. For example, on-board computer 10 can determine or receive movement databased on data received from navigation system 16, database 14, and/or remote server 24. In some examples, speed sensor 20 can provide the data representing the speed of the train (TR) and/or changes in the speed of the train (TR) to on-board computer 10 and inertial sensor 22 can provide the data representing acceleration (or deceleration) speed of the train (TR) to on-board computer 10. In some examples, positioning system 18 can provide one or both of the data representing the speed of the train (TR) and data representing the acceleration (or deceleration) of the train (TR) to on-board computer 10. In an example, the velocity, acceleration, or deceleration of the train (TR) can be determined by or provided to on-board computer 10 based on ground based measurements and/or satellite based measurement, such as GPS or real-time kinetic (RTK) measurements.

On-board computer 10 can determine or receive the movement data continuously, periodically, at specific times, or at specific locations of the train (TR). In an example, on-board computer 10 can continuously determine or receive the movement data throughout the entire process of deceleration of the train (TR) from a present speed at a present location to a target speed (including zero speed) at the target location and can, optionally, track said movement on a track database that can be stored in database 14 and which can include a virtual map of the geographical area, in particular, the track section (TS) being traversed by the train.

Further, in one preferred and non-limiting embodiment or aspect, on-board computer 10 is programmed or configured to determine or receive location data representing at least one of the following: the location or position of the train (TR) in the track network, the location or position of at least one locomotive or control car ((L1), (L2), and/or (L3)) in the track network, the location or position of a stop target (ST) or target location in the track network, and the location or position of the stop target (ST) or target location with respect to the current location or position of the train (TR) in the track network or the location or position of the at least one locomotive or control car ((L1), (L2), and/or (L3)) in the track network, a grade of a portion of the track, e.g., a grade of the track under at least a portion of the train, train bulletins and authorities, or any combination thereof. For example, on-board computer 10 can determine or receive the location data based on data received from navigation system 16, database 14, remote server 24, and/or a wayside device (WD). In some examples, data representing the location or position of the train (TR) in the track network and/or the location or position of the at least one locomotive or control car ((L1), (L2), and/or (L3)) in the track network is received from positioning system 18. In some examples, data representing the location or position of a stop target (ST) or target location in the track network is received from database 14, remote server 24, or wayside device (WD). In one example, the on-board computer 10 can determine or compute the location or position of the stop target (ST) or target location with respect to the current or present location or position of the train (TR) in the track network or the location or position of the at least one locomotive or control car ((L1), (L2), and/or (L3)) in the track network based on the data representing the train or locomotive location or position received from positioning system 18 and the data representing the stop target (ST) location or position received from database 14, remote server 24, or wayside device (WD). On-board computer 10 can determine or receive the location data continuously, periodically, at specified times, or at specified locations of the train (TR). For example, on-board computer 10 can continuously determine or receive location data during deceleration of the train (TR) to the target speed at the target location. In this example, the deceleration to the target speed (including zero speed) at the target location can be updated continuously, periodically, at specified times, or at specified locations during deceleration of the train (TR).

In one preferred and non-limiting embodiment or aspect, on-board computer 10 is programed or configured to cause the brakes of the train (TR) to be set according to a target deceleration curve, profile, or braking model that is included in database 14 store in a memory 32 of on-board computer 10. In an example, this target deceleration curve, profile, or braking model can be an estimate of the braking needed to decelerate the train (TR) from its present speed at its present location to the target speed (including zero speed) at the target location. In an example, the target deceleration curve, profile, or braking model can be selected with or without reference to a track profile/grade of the portion of track section (TS) on which the train (TR) is decelerating to the target speed at the target location. For example, if the portion of the track is generally flat, on-board computer 10 may choose a first target deceleration curve, profile, or braking model estimated to decelerate train (TR) to the target speed at the target location based on this track grade. In another example, if the section of track to the target location is generally inclined, on-board computer 10 may use a second target deceleration curve, profile, or braking model estimated decelerate the train (TR) to the target speed at the target location based on this inclining track grade. In yet another example, if the section of track to the target location is generally declining, the on-board computer 10 may use another target deceleration, profile, or braking model estimated to decelerate the train (TR) to the target location based on this declining track grade. Yet another target deceleration, profile, or braking model can be acquired from database 14 and used where the grade of section of track traveled by the train (TR) to the target location includes two or more of: level grade, inclining grade, and/or declining grade.

In one preferred and non-limiting embodiment or example, on-board computer 10 can, based on a geographical location of the track section (TS) traveled by the train (TR) to the target location, as determined by navigation system 16, can select one target deceleration, curve, profile, or braking model 250 (FIG. 4) out of a number of target deceleration curve, profile, or braking model's, wherein the selected target deceleration curve, profile, or braking model represents an estimate of the required level of braking to decelerate train (TR) from its present speed at its present location to the target speed at the target location. In an example, it is envisioned that database 14 can include a number of track grade sections corresponding to the travel of train (TR) on one or more track sections (TS) and, based on the grade or changing grade of each track section (TS), can select an appropriate target deceleration curve, profile, or braking model estimated to decelerate the train (TR) from its present speed at its present location to the target speed at the target location. However, this is not to be construed in a limiting sense since it is also or alternatively envisioned that the selection of any one particular target deceleration curve, profile, or braking model from many can be based on a distance estimated to decelerate the train (TR) from the present speed at a present location to the target speed at the target location without reference to track grade and/or any changes in track grade.

The following will now describe an example of the use of two target deceleration curve, profile, or braking models regardless of how each target deceleration curve, profile, or braking model is selected.

Figure 3:
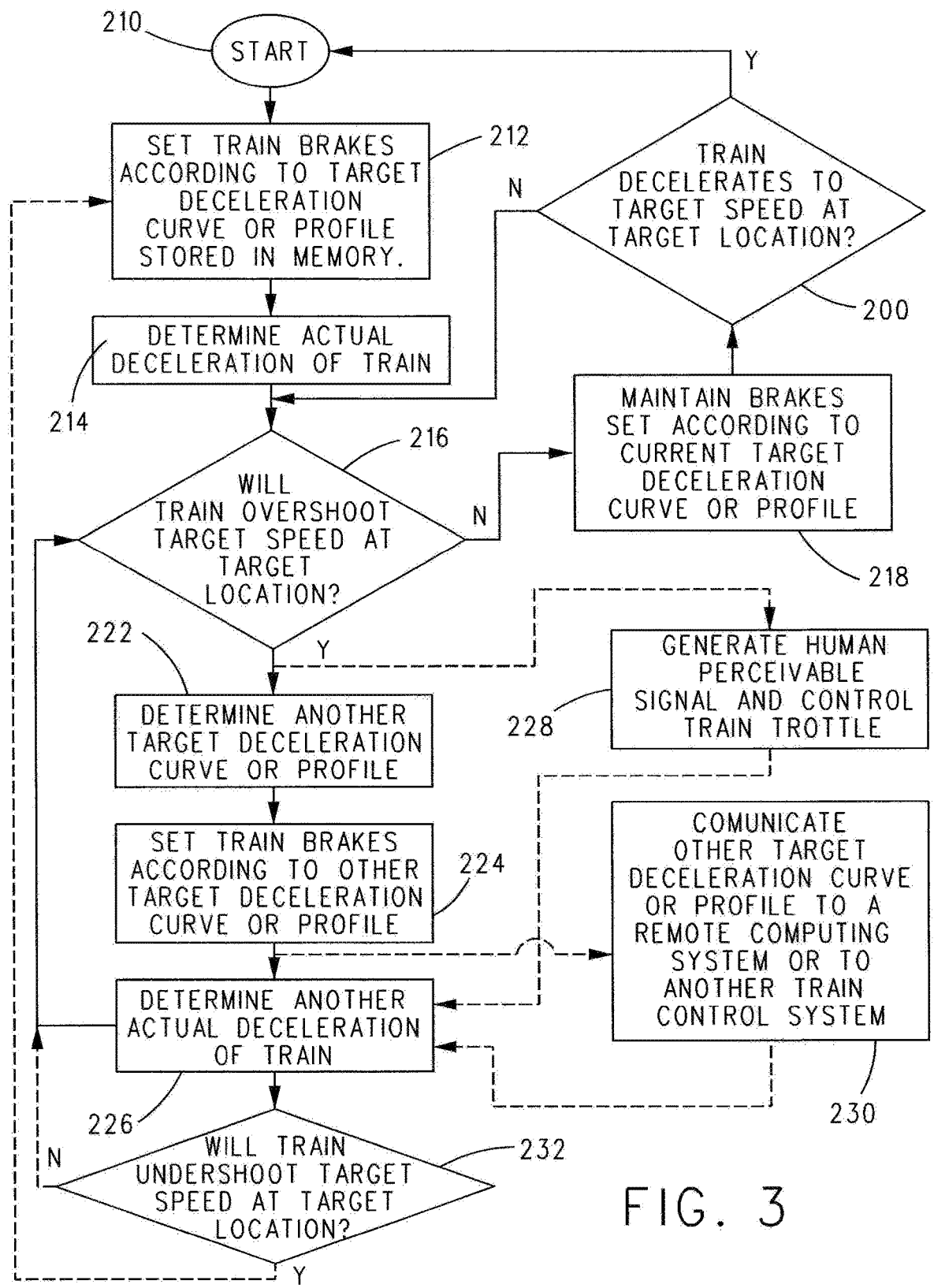
FIG. 3 is a flow chart illustrating a method of train braking according to the principles of the present invention.
Figure 4:
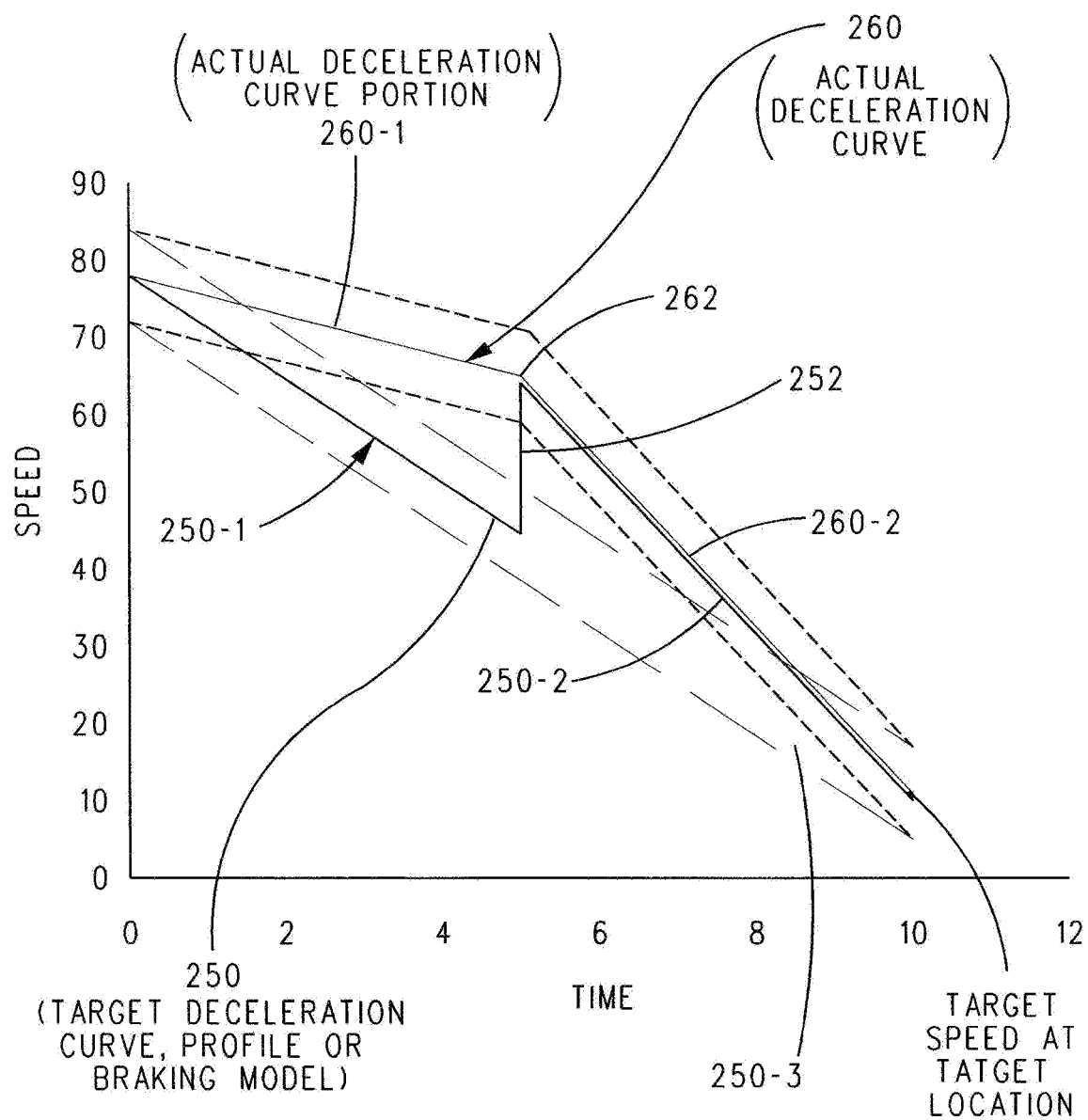
FIG. 4 is a speed versus time graph of a target deceleration curve, profile, or braking model and portions thereof, and corresponding actual deceleration curve portions in accordance with the principles of the present invention.

With reference to the flow diagram of FIG. 3, the speed versus time graph of FIG. 4, and with continuing reference to FIGS. 1 and 2, in a method of train deceleration, the method advances from a start step 210 to a step 212 wherein on-board computer 10 sets the train brakes according to a target deceleration curve, profile, or braking model 250 included in database 14 stored in memory 32 of on-board computer 10. This target deceleration curve, profile, or braking model 250 is an estimate of the brake setting (or level of braking) needed to decelerate train (TR) from its present speed at its present location to the target speed at the target location.

The method then advances to the step 214 wherein on-board computer 10 determines the actual deceleration of 260 of train (TR) based on a change in speed (deceleration) of train (TR) over time, which change in speed can be determined from, for example, without limitation, data output by speed sensor 20, inertial sensor 22, and/or positioning system 19. The method then advances to step 216 wherein on-board computer 10 determines, based on the actual deceleration curve 260 of the train (TR) determined in step 214, whether the train (TR) will overshoot the target speed at the target location. If not, the method advances to step 218 wherein on-board computer 10 maintains the train brakes set according to the target deceleration curve, profile, or braking model 250 (FIG. 4). Thereafter, the method advances to step 220 wherein on-board computer 10 determines if train (TR) is decelerating to the target speed at the target location (ST). If not, the method returns to step 216. Otherwise the method returns to start step 210. On the other hand, if, in an instance of step 216, on-board computer 10 determines that train (TR) will overshoot the target speed at the target location, the method advances to step 222 wherein on-board computer 10 determines another target deceleration curve, profile, or braking model 10 to be utilized.

Referring to FIG. 4, on-board computer 10 determining that train (TR) will overshoot the target speed at the target location is illustrated by the portion of actual deceleration of curve 260 labeled 260-1. As can be understood from curve portion 260-1, the train (TR) is decelerating at a rate slower than estimated by target deceleration curve 250. In FIG. 4, the dashed lines above and below target deceleration curve, profile, or braking model 250 represent upper and lower bounds of acceptable deviance of train deceleration from the actual deceleration curve which, in FIG. 4, would runs parallel to target deceleration curve, profile, or braking model 250. In the example shown in FIG. 4, on-board computer 10 recognizes that the actual deceleration of train (TR) illustrated by curve portion 260-1 has exceeded the upper acceptable bound of target deceleration curve, profile, or braking model 250 and will, if uncorrected, result in train (TR) overshooting the target speed at the target location. In this scenario, the method advances to step 222 wherein on-board computer 10 determines another target deceleration curve, profile, or braking model 250-2 that is estimated to decelerate train (TR) from its present speed 262 at its present location to the target speed at the target location. In an example, in response to executing step 222, on-board computer 10 determines that target deceleration curve, profile, or braking model 250-2 is estimated to decelerate the train (TR) from its present speed 262 at its present location to the target speed at the target location.

Each target deceleration curve, profile, or braking model can be considered an "estimate" due to any one or number of train (TR) and/or environmental variables. For example, target deceleration curve, profile, or braking model 250 can represent the deceleration of the train (TR) when the brakes are new. In contrast, the actual deceleration curve portion 260-1 can represent the actual deceleration of the train (TR) when the brakes are used. In another example, target deceleration curve, profile, or braking model 250 can represent an estimated deceleration of the train (TR) under ideal environmental conditions, i.e., dry track at 20° C. In contrast, actual deceleration curve portion 260-1 can represent the deceleration of the train under wet or icy conditions. Accordingly, to account for these variables, on-board computer 10 can be programmed or configured to determine when the actual deceleration of the train (TR) will result in the train (TR) overshooting the target speed at the target location and can select another target deceleration curve and/or portion 260-2 that is estimated to decelerate train (TR) from its present speed 262 at its present location to the target speed at the target location.

Returning to the FIG. 3, the method then advances from step 222 to step 224 wherein on-board computer 10 sets the train brakes according to the other target deceleration curve or portion 250-2. In FIG. 4, the actual deceleration curve portion 260-1 can relate to the deceleration of train (TR) in response to the train brakes being set according to target deceleration curve portion 250-1 of the originally used target deceleration curve, profile, or braking model 250. The actual deceleration curve portion 260-2 can represent the deceleration of the train in response to the train brakes being set according to the other target deceleration curve, profile, or braking model 250-2. As can be understood from FIG. 4, in response to the method executing step 224, the target deceleration curve, profile, or braking model 250-1 current being executed by on-board computer 10 changes to target deceleration curve, profile, or braking model 250-2 in a step 252. In an example, the step 252 change from target deceleration curve, profile, or braking model 250-1 to target deceleration curve, profile, or braking model 250-2 can result in a rapid change in the setting of the train brakes (e.g., to more aggressive braking) to decelerate the train (TR) from its current speed 262 at its current location to the target speed at the target location. However, step 252 can be a more gradual change to avoid a sudden increase in braking effort and any corresponding undesirable forces on the train.

The method then advances to step 226 wherein on-board computer 10 determines yet another instance of the actual deceleration curve of the train (TR). The method then advances from step 226 back to step 216 wherein on-board computer 10 determines if the train (TR) will overshoot the target speed at the target location based on the actual deceleration curve of the train (TR) determined in step 226. If so, method steps 222-226 can be repeated as necessary until a target deceleration curve, profile, or braking model is used that can decelerate the train to the target speed at the target location. If, however, in step 216 on-board computer 10 determines that the train (TR) will not overshoot the target speed at the target location, the method advances from step 216 to step 218 where the brakes are maintained set according to the current or present target deceleration curve, profile, or braking model. The method then advances to step 220 where on-board computer 10 determines again if the train (TR) is decelerating to the target speed at the target location. If so, the method advances back to start step 210. However, if, in an instance of step 220, on-board computer 10 determines that train (TR) is not decelerating to the target speed at the target location, the method returns to step 216.

In one preferred and non-limiting embodiment or example, steps 210-226 of the method shown in FIG. 3 can be part of a first, continuous braking event, as illustrated in FIG. 4. For example, in response to on-board computer 10 determining a difference between an actual deceleration curve of train (TR) (260-1) according to a first target deceleration curve, profile, or braking model 250-1, on-board computer 10 causes the brakes of the train (TR) to be set according a second target deceleration curve, profile, or braking model 250-2 that is estimated to decelerate the train (TR) from its current speed 262 at its current location to the target speed at the target location. In this manner, during a continuous braking event, on-board computer 10 can, in response to an actual deceleration curve 260-1 varying from a target deceleration curve, profile, or braking model 250-1, determine another target deceleration curve, profile, or braking model 250-2 that is estimated to decelerate the train (TR) to the target speed at target location and utilize this other target deceleration curve, profile, and model 250-2. As shown in FIG. 4, via step 252, the other target deceleration curve, profile, or braking model 250-2 can be appended to the end of target deceleration curve, profile, or braking model 250-1 in a continuous braking event, whereupon the train brakes are caused to implement an increase in braking effort in an attempt to decelerate train (TR) to the target speed at the target location.

In an example, on-board computer 10 can utilize any number of different target deceleration curves, profiles, or braking models deemed suitable and/or desirable to decelerate the train (TR) to the target speed at the target location regardless of any differences between each target deceleration curve, profile, and model and its corresponding actual deceleration curve. See, e.g., steps 216-226 in FIG. 3

In one preferred and non-limiting embodiment or example, the brakes of train (TR) being set according to any target deceleration curve, profile, or braking model can include the train brakes being operated in a service braking mode, wherein one or more wheels of the train (TR) rotate against a friction provided by a braking system of the train (TR) during movement of train (TR).

In one preferred and non-limiting embodiment or example, the brakes of the train (TR) being set according to the other target deceleration curve, profile, or braking model can include the train being decelerated to the target speed at the target location.

In one preferred and non-limiting embodiment or example, as shown in FIG. 3, steps 216, 222, 224, and 226 can be repeated as necessary in order to determine any number of target deceleration curves, profiles, or braking models estimated to decelerate the train (TR) to the target speed at the target location and cause the brakes of the train (TR) to be set accordingly. In an example, steps 222, 224, and 226 can be repeated at least two times whereupon on-board computer 10 utilizes three target deceleration curves, profiles, or braking models to decelerate the train (TR) to the target speed at the target location.

In an example, a first instance of step 224 can include the brakes operating in a service braking mode. An instance of step 224 after this first instance can include the brakes operating in an emergency braking mode, wherein one or more wheels of the train (TR) are prevented from rotation by the rain braking system during movement of the train (TR). In an example, emergency braking may only be used when on-board computer 10 determines that braking in accordance with service braking is not proving effective to decelerate the train to the target speed at the target location, e.g., due to train and/or environmental conditions.

In one preferred and non-limiting embodiment or example, the initial target deceleration curve, profile, or braking model used in step 212 can be refined or updated in memory based on one or more target deceleration curves determined in step 222. For example, if a single instance of step 222 determining another target deceleration curve, profile, or braking model was required to cause train (TR) to decelerate to the target speed at the target location, then the target deceleration curve, profile, or braking model initially used in step 212 can be updated in memory and used in a future braking event. In another example, if two or more target deceleration curves, profiles, or braking models determined in steps 212 and 222 were needed to cause the train (TR) to decelerate to the target speed at the target location, the combination (e.g., average) of these two or more target deceleration curves, profiles, or braking models, can be stored in memory in place of the target deceleration curve, profile, or braking model initially used in step 212. A benefit of refining or updating the target deceleration curve, profile, or braking model initially selected in 212 based on one or more target deceleration curve, profile, or braking models used to decelerate the train (TR) to the target speed at the target location is that the refined/updated target deceleration curve, profile, or braking model can be based on past braking experience and can be used by on-board computer 10 to brake train (TR) on track section (TS) during a current continuous braking event or during a different continuous braking event on track section (TS) at a later time.

Referring back to FIG. 3, in one preferred and non-limiting embodiment or example, the method can include optional step 232 following step 226. In step 232, on-board computer 10 determines if train (TR) will undershoot the target speed at the target location. If not, the method returns to step 216. However, if, in step 232, on-board computer 10 determines that (TR) train will indeed undershoot the target speed at the target location, the method returns to step 212 wherein the train brakes are set according to the target deceleration curve initially used in step 212. An advantage of step 232 is that if one or more target deceleration curves, profiles, or braking models utilized in one or more instances of step 224 is based on a temporary condition, such as, for example, icing of the brakes and/or track section (TS), once this condition is cleared, the target deceleration curve, profile, or braking model initially used in step 212 can be used by on-board computer 10 to set the train brakes to decelerate the train (TR) to the target speed at the target location. In this manner, temporary conditions that may cause degraded performance of the train brakes may not be used as a basis for future selection of a target deceleration curve, profile, or braking model.

In one preferred and non-limiting embodiment or example, the method can also include optional step 228 that can be executed in parallel with steps 222 and 224 in response to determining that the actual deceleration curve, e.g., curve portion 260-1, will result in train (TR) overshooting the target speed at the target location. In step 228, on-board computer 10 can generate a human perceivable signal and can, optionally, control a throttle of the train in combination with the brakes of train (TR) being set according to the other target deceleration curve, profile, or braking model determined in step 224 in an effort to decelerate the train (TR) to decelerate to the target speed at the target location.

In one preferred and non-limiting embodiment or example, if, in step 216, on-board computer 10 determines that the train (TR) will not overshoot the target speed at the target location, the method advances to step 218 wherein on-board computer 10 maintains the train brakes set according to the currently used target deceleration curve, profile, or braking model. The method then advances to step 220 where on-board computer 10 determines that if the train (TR) is decelerating to the target speed at the target location. If so, the method returns to start step 210. If, however, in step 220, on-board computer 10 determines that the train (TR) is not decelerating to the target speed at the target location, the method returns to step 216.

In one preferred and non-limiting embodiment or example, if, in each instance of execution of step 216, on-board computer 10 determines that the train (TR) will not overshoot the target speed at the target location, steps 216-220 are repeated until the train (TR) decelerates to the target speed at the target location whereupon, in an instance of execution of step 220 after the train has decelerated to the target speed at the target location, the method can return to step 210. From step 210, the method can advance to step 212 where a target deceleration curve, profile, or braking model stored in memory can be selected and used for the next braking event. An advantage of on-board computer 10 returning to start step 210 once the train (TR) has decelerated to the target speed at the target location is that a target deceleration curve, profile, or braking model stored in memory and earmarked for use on track section (TS) can once again be used, whereupon any braking, train, or track conditions that may have previously resulted in the use of another target deceleration curve, profile, or braking model that may no long apply are not used for future braking events which may not require the use of said one or more other target deceleration curves, profiles, or braking models.

In one preferred and non-limiting embodiment or example, any other target deceleration curve, profile, or braking model determined in an instance of execution of step 222 can be communicated from train control system 100 to a remote computing system 240 (FIG. 1) via a first communication link 242 (FIG. 1) between train control system 100 and remote computing system 242, as shown by step 230 in FIG. 3. In one preferred and non-limiting embodiment or example, the remote computing system 240 can communicate the other target deceleration curve, profile, or braking model received from train control system 100 to another train control system 244 (FIG. 1) via a second communication link 246 (FIG. 1). Alternatively, for example, any other target deceleration curve, profile, or braking model determined in an instance of step 222 can be communicated (as shown by step 230) directly from train control system 100 to train control system 244 via a communication link 248 (FIG. 1), bypassing remote computing system 240. In an example, each communication link can include a wired connection, a wireless connection, or a combination of a wired and wireless connection.

Figure 5A:
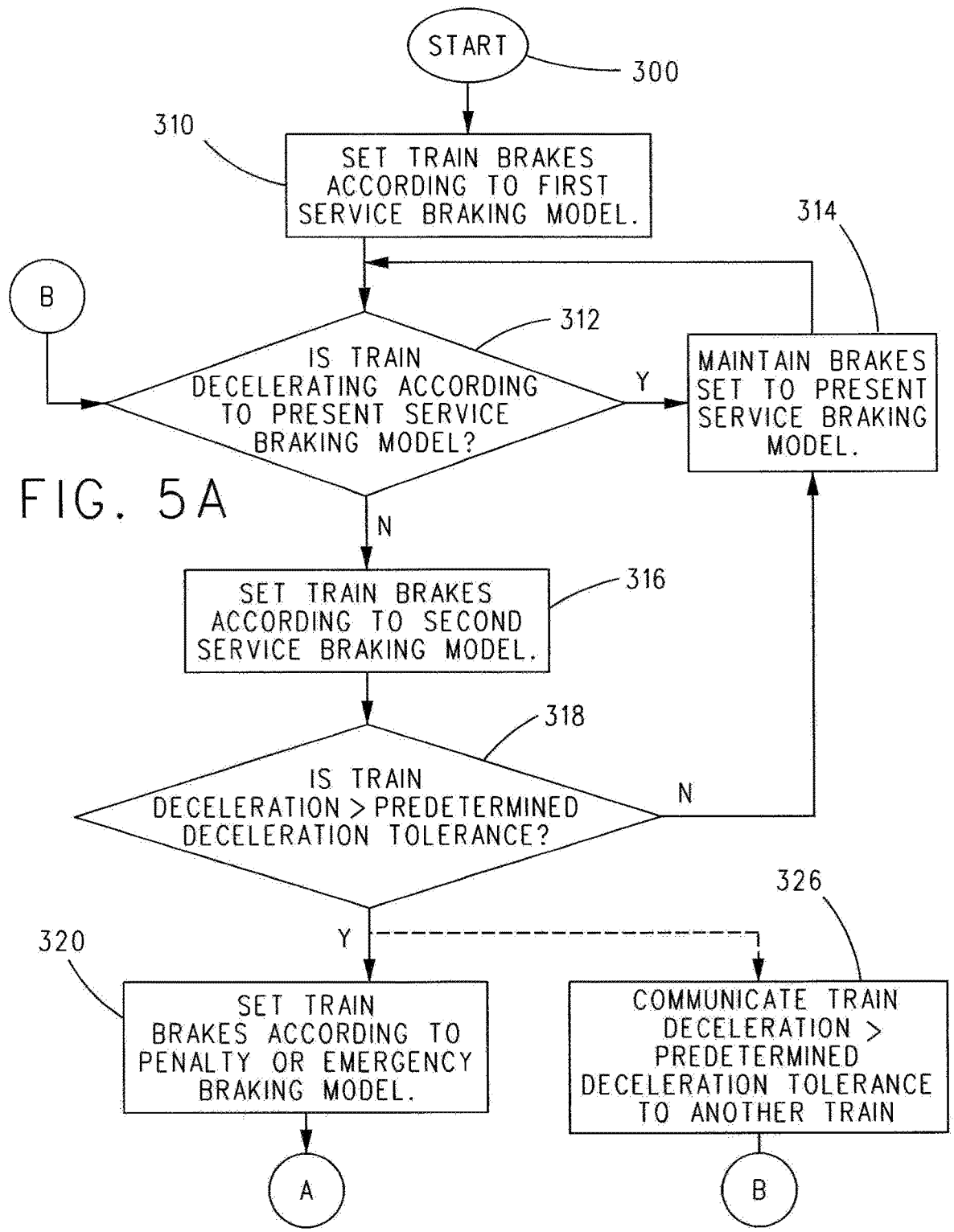
FIGS. 5A and 5B are a flow chart of a method of train braking in accordance with the principles of the present invention.
Figure 5B:
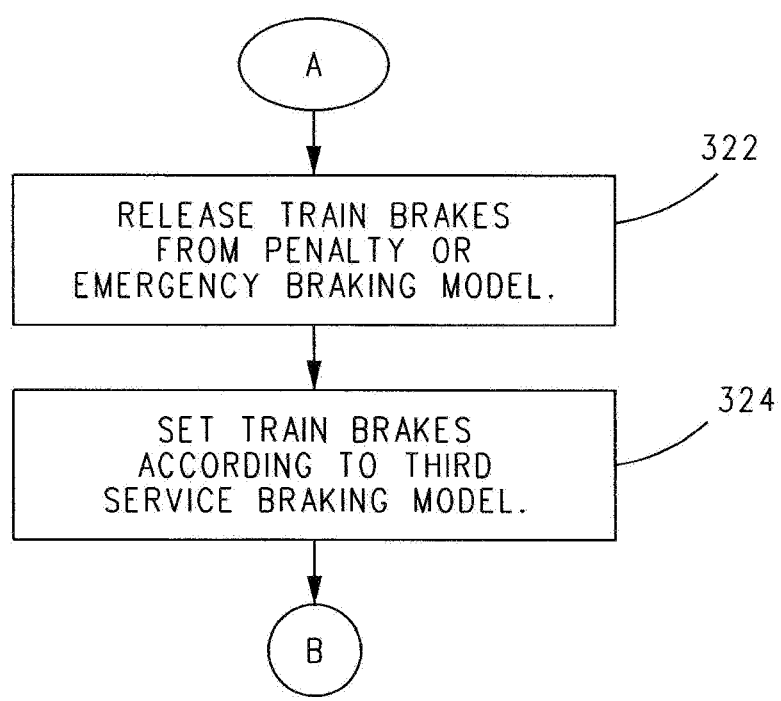

With reference to FIGS. 5A and 5B, and with continuing reference to FIGS. 1, 2, and 4, in one preferred and non-limiting embodiment or example, another method of train deceleration by an on-board computer 10 can also be described with reference to one or more braking models which can be considered similar to a target deceleration curve, profile, or braking model described above. The method of FIGS. 5A-5B further relate to the use of a penalty or emergency braking model when one or more service braking models prove insufficient to decelerate the train (TR) in a desired manner, e.g., due to adverse environmental conditions or train conditions, and then return to the use of service braking models upon determining that this later service braking model will be effective to decelerate the train (TR) in a desired manner.

Referring to FIGS. 5A-5B, the method initially advances from start step 300 to step 310 where on-board computer 10 sets the train brakes according to a first service braking model. The method then advances to step 312 wherein on-board computer 10 determines if the train (TR) is decelerating according to the present service braking model. If so, the method advances to step 314 wherein the brakes are maintained set to the present service braking model.

If, however, in step 312 on-board computer 10 determines that the brakes are not decelerating the train (TR) according to the present service braking model, the method advances to step 316 where the on-board computer 10 sets the brakes of the train (TR) according to a second service braking model. The method then advances to step 318 where the on-board computer 10 determines if the train (TR) is decelerating greater than a predetermined upper limit. In an example, this predetermined upper limit sets the upper limit of acceptable train deceleration programed into control system 100. In FIG. 4, the upper and lower limits of train deceleration are shown by the dashed lines on either side of target deceleration curve, profile, or braking model portion 250-1. In an example, if the actual train deceleration is greater than the predetermined upper limit, then train (TR) is not decelerating at a rate sufficient to decelerate train (TR) to the target speed at the location and on-board computer 10 can take appropriate action described hereinafter.

If, in an instance of step 318, on-board computer 10 determines that the train deceleration is not greater than the predetermined deceleration limit, the method advances to step 314. On the other hand, if, in an instance of step 318, on-board computer determines that the train deceleration is indeed greater than the predetermined limit, the method advances to step 320.

In response to on-board computer 10 executing step 320, the train brakes are set according to a penalty or emergency braking model. In accordance with the penalty or emergency braking model, the wheels of the train (TR) can be locked against rotation by the train braking system. Braking in accordance with the penalty or emergency braking model can continue until the train (TR) has reached a desirable level of deceleration (including, for example, coming to a complete stop). The method can then advance to step 322 wherein the train brakes are released from the penalty emergency braking model.

The method can then advance to step 324 where the train brakes are set according to a third service braking model. The execution of step 324 can be preceded by a determination by a train operator or on-board computer 10 that the third service braking model will be effective for decelerating the train (TR) following the brakes being set according to the penalty or emergency braking model.

In one preferred and non-limiting embodiment or example, the use of the first and second service braking models and the penalty or emergency braking model described above can be part of a first continuous braking event of train (TR). This deceleration of train (TR) using the first and second service braking models and the penalty or emergency braking model described above can occur in response to unusual operating conditions of the train (TR) or unusual environmental conditions, such as icing of the train brakes and/or track. In an example, the use of the third service braking model can be part of a second, different continuous braking event of the train (TR) that can occur following clearing of the unusual operating conditions of the train (TR) and/or the unusual environmental conditions.

In one preferred and non-limiting embodiment or example, the third service braking model can be the same as the first or second service braking model.

Following step 324, the method can return to step 312. Upon the train decelerating to the target speed at the target location, on-board computer 10 can return to step 300 for the next braking event.

The method can include the optional step 326 of communicating the determination of the train (TR) deceleration being greater than the predetermined acceleration tolerance (step 318) to another train control system 244. This determination can be communicated via communication link 248 or via communication links 242 and 246 in FIG. 1. In response to receiving this determination, the other train control system 244 and can cause its train brakes to be set according to a fourth service braking model. In an example, this fourth service braking model implemented by the control system 224 of the other train can account for the unusual operating conditions or the unusual environmental conditions experienced by the train (TR) that includes on-board computer 10. In an example, the fourth service braking model can be selected in a way that can avoid the use of a penalty or emergency braking model.

Although the invention has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect.

The invention claimed is:

1. A method comprising:
    setting brakes of a vehicle according to a first target deceleration braking model estimated to decelerate the vehicle from a present speed at a present location to a target speed at a target location;
    determining a first actual deceleration curve of the vehicle during deceleration of the vehicle according to the first target deceleration braking model;
    determining a different, second target deceleration braking model estimated to decelerate the vehicle to the target speed at the target location responsive to determining that the first actual deceleration curve will result in the vehicle moving faster than the target speed at the target location; and
    setting the brakes of the vehicle according to the second target deceleration braking model of step (c) during movement of the vehicle,
    wherein the first target deceleration braking model and the second target deceleration braking model include a service braking mode, an emergency braking mode, or a combination of the service braking mode and the emergency braking mode,
    wherein the emergency braking mode includes one or more wheels of the vehicle prevented from rotating by the brakes of the vehicle during the movement of the vehicle.

2. The method of claim 1, wherein setting the brakes of the vehicle according to the first target deceleration braking model, determining the first actual deceleration curve of the vehicle, determining the different, second target deceleration braking model, and setting the brakes of the vehicle according to the second target deceleration braking model include the brakes operating in the service braking mode, the one or more wheels of the vehicle rotate against a friction provided by a braking system of the vehicle during the movement of the vehicle.

3. The method of claim 1, wherein setting the brakes of the vehicle according to the second target deceleration braking model during the movement of the vehicle includes the vehicle decelerating to the target speed at the target location.

4. The method of claim 1, further including:
    determining a second actual deceleration curve of the vehicle during deceleration of the vehicle according to the other second target deceleration braking model;
    determining a third target deceleration braking model estimated to decelerate the vehicle to the target speed at the target location in response to determining that the second actual deceleration braking model will result in the vehicle moving faster than the target speed at the target location; and
    setting the brakes of the vehicle according to the third target deceleration braking model.

5. The method of claim 4, wherein setting the brakes of the vehicle according to the third target deceleration braking model includes the vehicle decelerating to the target speed at the target location.

6. The method of claim 4, wherein:
    a first instance of setting the brakes of the vehicle to the third target deceleration braking model according to the service braking mode; and a second instance of setting the brakes of the vehicle to the third target deceleration braking model according to the emergency braking mode.

7. The method of claim 6, wherein:
the emergency braking mode includes the one or more wheels of the vehicle prevented from rotating by a braking system of the vehicle during movement of the vehicle; and
the service braking mode includes the one or more wheels of the vehicle rotating against a friction provided by the braking system of the vehicle during movement of the vehicle.

8. The method of claim 4, further including:
refining the first target deceleration braking model according to a numerical combination of the target deceleration braking model determined during determining the different, second target deceleration braking model and determining the third target deceleration braking model; and
setting the brakes of the vehicle according to the refined target deceleration braking model.

9. The method of claim 1, further including:
refining the first target deceleration braking model according to the target deceleration braking model; and
setting the brakes of the vehicle according to the refined first target deceleration braking model.

10. The method of claim 1, wherein the first actual deceleration curve of the vehicle is determined according to ground-based measurements or satellite-based measurements.

11. The method of claim 1, further including:
determining a third actual deceleration curve of the vehicle during deceleration of the vehicle according to the other target deceleration braking model; and
setting the brakes of the vehicle according to the first target deceleration braking model in response to determining that the third actual deceleration braking model will result in the vehicle moving slower than the target speed at the target location.

12. The method of claim 1, further including communicating the second target deceleration braking model from a first vehicle computing system to a remote computing system via a first communication link between the vehicle computing system and the remote computing system.

13. The method of claim 12, wherein the remote computing system communicates the second target deceleration braking model received from the first vehicle computing system to a second vehicle computing system via a second communication link.

14. The method of claim 13, wherein each of the first communication link and the second communication link comprises a wired connection, a wireless connection, or a combination wired and wireless connection.

15. A method comprising:
causing brakes of a first vehicle to be set according to a first service braking model;
setting the brakes of the first vehicle according to a second service braking model in response to determining that the first vehicle is not decelerating according to the first service braking model, wherein the first service braking model includes one or more wheels of the first vehicle rotating against a friction provided by a braking system of the first vehicle during movement of the first vehicle;
setting the brakes of the first vehicle to a penalty or emergency braking model in response to determining that deceleration of the first vehicle according to the second service braking model is greater than a predetermined deceleration tolerance, wherein the emergency braking model includes one or more wheels of the first vehicle prevented from rotating by the brakes of the first vehicle during the movement of the first vehicle; and
setting the brakes of the first vehicle according to a third service braking model in response to determining that the brakes of the first vehicle set according to the third service braking model decelerates the first vehicle according to the third service braking model.

16. The method of claim 15, wherein the third service braking model is the same as the first or second service braking model.

17. The method of claim 15, further including:
communicating a determination that deceleration of the first vehicle according to the second service braking model is greater than the predetermined deceleration tolerance to an on-board vehicle computing systems of a second vehicle.

18. The method of claim 17, wherein, in response to receiving the determination, the on-board vehicle computing systems of the second vehicle sets the brakes of the second vehicle according to a fourth service braking model.

19. The method of claim 18, wherein the fourth service braking model is the same as the first, second, or third service braking model.

20. A system comprising:
one or more processors configured to direct setting of brakes of a vehicle according to a first target deceleration braking model estimated to decelerate the vehicle from a present speed at a present location to a target speed at a target location, the one or more processors configured to determine an actual deceleration curve of the vehicle during deceleration of the vehicle according to the first target deceleration braking model, the one or more processors configured to determine a different, second target deceleration braking model estimated to decelerate the vehicle to the target speed at the target location responsive to determining that the actual deceleration curve will result in the vehicle moving faster than the target speed at the target location, the one or more processors configured to direct setting of the brakes of the vehicle according to the second target deceleration braking model during movement of the vehicle,
wherein the first target deceleration braking model and the second target deceleration braking model include a service braking mode, an emergency braking mode, or a combination of the service braking mode and the emergency braking mode,
wherein the emergency braking mode includes one or more wheels of the vehicle prevented from rotating by the brakes of the vehicle during movement of the vehicle.

* * * * *

UNITED STATES PATENT AND TRADEMARK OFFICE
CERTIFICATE OF CORRECTION

PATENT NO. : 10,889,276 B2
APPLICATION NO. : 16/146185
DATED : January 12, 2021
INVENTOR(S) : Andrew Ryan Staats et al.

It is certified that error appears in the above-identified patent and that said Letters Patent is hereby corrected as shown below:

In the Claims

In Claim 17 at Column 20, Line 24, the portion reading "vehicle computing systems" should read --vehicle computing system--.

Signed and Sealed this
Twenty-fifth Day of October, 2022

Katherine Kelly Vidal
*Director of the United States Patent and Trademark Office*